(12) United States Patent
Takeda

(10) Patent No.: US 11,150,085 B2
(45) Date of Patent: Oct. 19, 2021

(54) SEWING SYSTEM AND THREE-DIMENSIONAL MEASUREMENT DEVICE

(71) Applicant: JUKI CORPORATION, Tama (JP)

(72) Inventor: Toshiyuki Takeda, Tama (JP)

(73) Assignee: JUKI CORPORATION, Tama (JP)

( * ) Notice: Subject to any disclaimer, the term of this patent is extended or adjusted under 35 U.S.C. 154(b) by 0 days.

(21) Appl. No.: 16/415,152

(22) Filed: May 17, 2019

(65) Prior Publication Data

US 2019/0353476 A1 Nov. 21, 2019

(30) Foreign Application Priority Data

May 21, 2018 (JP) .............................. JP2018-097461

(51) Int. Cl.
*G01B 11/00* (2006.01)
*G01B 11/24* (2006.01)
*G06K 9/00* (2006.01)

(52) U.S. Cl.
CPC ............ *G01B 11/24* (2013.01); *G01B 11/005* (2013.01); *G06K 9/00201* (2013.01)

(58) Field of Classification Search
CPC .... D05D 2305/32; D05B 19/12; D05B 21/00; G01B 11/2513
See application file for complete search history.

(56) References Cited

U.S. PATENT DOCUMENTS

| | | | | |
|---|---|---|---|---|
| 3,835,798 A * | 9/1974 | Fresard | ................ | D05B 29/08 112/150 |
| 4,608,936 A * | 9/1986 | Ball | ...................... | B26D 1/185 112/104 |
| 4,989,525 A * | 2/1991 | Portilla | ................. | B60R 21/235 112/10 |
| 5,239,475 A * | 8/1993 | Shigeta | ............ | G05B 19/40932 700/137 |
| 5,381,743 A * | 1/1995 | Moll | ...................... | D05B 23/00 112/2.1 |
| 5,400,730 A * | 3/1995 | Moll | ...................... | D05B 59/04 112/168 |
| 5,456,194 A * | 10/1995 | Badillo | ................... | D05B 3/06 112/470.14 |
| 5,570,647 A * | 11/1996 | Adamski, Jr. | .......... | D05B 33/00 112/153 |
| 5,615,318 A * | 3/1997 | Matsuura | ............... | A41H 3/007 345/420 |
| 5,664,512 A * | 9/1997 | Foster | .................... | D05B 21/00 112/470.07 |
| 5,769,013 A * | 6/1998 | Morita | ................. | D05B 19/105 112/102.5 |

(Continued)

FOREIGN PATENT DOCUMENTS

JP 2001-317904 A 11/2001

*Primary Examiner* — Martin Mushambo
(74) *Attorney, Agent, or Firm* — Faegre Drinker Biddle & Reath LLP

(57) ABSTRACT

An aspect of the present invention is a sewing system which includes a sewing machine that sews a workpiece, and a three-dimensional measurement device that measures a three-dimensional shape of the workpiece. According to an aspect of the present invention, it is possible to appropriately implement quality control of a product produced by sewing.

17 Claims, 14 Drawing Sheets

(56) References Cited

U.S. PATENT DOCUMENTS

| | | | | |
|---|---|---|---|---|
| 5,862,768 | A * | 1/1999 | Tsukahara | D05B 19/12 112/277 |
| 5,865,135 | A * | 2/1999 | Price | A41H 43/0257 112/147 |
| 5,956,525 | A * | 9/1999 | Minsky | A41H 1/02 33/15 |
| 6,101,424 | A * | 8/2000 | Sawada | A41H 1/00 700/136 |
| 6,232,980 | B1 * | 5/2001 | Liepa | G06T 15/04 345/419 |
| 6,310,627 | B1 * | 10/2001 | Sakaguchi | A41H 3/007 345/630 |
| 6,336,417 | B1 * | 1/2002 | Kawahito | D05B 69/36 112/272 |
| 6,389,322 | B1 * | 5/2002 | Park | A47C 31/11 700/98 |
| 6,499,513 | B1 * | 12/2002 | Couch | A41H 3/08 112/470.03 |
| 6,834,960 | B2 * | 12/2004 | Dbjay | G03B 15/00 352/243 |
| 6,842,175 | B1 * | 1/2005 | Schmalstieg | G06F 3/011 345/427 |
| 6,997,125 | B1 * | 2/2006 | Kobayashi | D05B 21/00 112/153 |
| 7,039,486 | B2 * | 5/2006 | Wang | A41H 1/00 33/512 |
| 7,663,648 | B1 * | 2/2010 | Saldanha | G06T 17/00 345/630 |
| 8,525,828 | B1 * | 9/2013 | Bates | G06T 15/00 345/419 |
| 9,542,769 | B2 * | 1/2017 | Kim | G06T 15/04 |
| 9,554,096 | B1 * | 1/2017 | Eakins | A41H 5/01 |
| 9,696,130 | B1 * | 7/2017 | Eakins | G01B 21/20 |
| 10,190,873 | B1 * | 1/2019 | Yamagami | G01B 11/2545 |
| 10,628,729 | B2 * | 4/2020 | Sareen | G06N 3/006 |
| 10,679,046 | B1 * | 6/2020 | Black | G06T 17/00 |
| 2003/0188675 | A1 * | 10/2003 | Valeriote | D05B 11/00 112/117 |
| 2003/0209176 | A1 * | 11/2003 | Keilmann | D05B 29/02 112/2 |
| 2004/0060494 | A1 * | 4/2004 | Martelli | D05B 29/08 112/150 |
| 2004/0129189 | A1 * | 7/2004 | Oxley | D05B 11/005 112/2.1 |
| 2005/0134853 | A1 * | 6/2005 | Ingleson | G01N 21/255 356/402 |
| 2007/0005175 | A1 * | 1/2007 | Konig | D05B 21/00 700/138 |
| 2007/0009150 | A1 * | 1/2007 | Suwa | G06T 7/521 382/154 |
| 2007/0064245 | A1 * | 3/2007 | Yoshino | G01B 11/2527 356/603 |
| 2007/0090189 | A1 * | 4/2007 | Suwa | G06T 7/521 235/454 |
| 2007/0227423 | A1 * | 10/2007 | Noguchi | D05B 69/36 112/220 |
| 2008/0123103 | A1 * | 5/2008 | Fujii | G01B 11/2441 356/496 |
| 2008/0262944 | A1 * | 10/2008 | Wu | G06Q 30/0643 705/27.2 |
| 2009/0188415 | A1 * | 7/2009 | Tokura | G06T 7/70 112/470.01 |
| 2009/0301369 | A1 * | 12/2009 | Kawaguchi | D05B 19/12 112/274 |
| 2009/0312861 | A1 * | 12/2009 | Hirose | D05B 3/06 700/136 |
| 2010/0195114 | A1 * | 8/2010 | Mitsumoto | G01B 11/2509 356/601 |
| 2010/0231923 | A1 * | 9/2010 | Ge | G01M 11/025 356/511 |
| 2011/0088606 | A1 * | 4/2011 | Kawaguchi | D05C 5/04 112/470.04 |
| 2012/0006241 | A1 * | 1/2012 | Nishiyama | D05B 3/02 112/221 |
| 2012/0019836 | A1 * | 1/2012 | Honma | G01B 11/2527 356/603 |
| 2012/0086783 | A1 * | 4/2012 | Sareen | G06T 19/00 348/47 |
| 2012/0234222 | A1 * | 9/2012 | Naka | D05B 19/12 112/470.03 |
| 2012/0265338 | A1 * | 10/2012 | Keibel | B25J 9/1674 700/245 |
| 2013/0125803 | A1 * | 5/2013 | Tseng | D05B 19/10 112/475.19 |
| 2013/0238285 | A1 * | 9/2013 | Volchek | A41H 5/01 702/188 |
| 2014/0033960 | A1 * | 2/2014 | Evans | D05B 19/12 112/470.02 |
| 2014/0035913 | A1 * | 2/2014 | Higgins | G06Q 30/00 345/420 |
| 2014/0225888 | A1 * | 8/2014 | Bell | G06T 19/00 345/419 |
| 2014/0366241 | A1 * | 12/2014 | Kido | A41B 1/08 2/116 |
| 2015/0045939 | A1 * | 2/2015 | Kongo | D05B 19/12 700/143 |
| 2015/0122165 | A1 * | 5/2015 | Maki | D05B 37/063 112/470.05 |
| 2015/0252503 | A1 * | 9/2015 | Tokura | D05B 19/12 112/470.01 |
| 2016/0078663 | A1 * | 3/2016 | Sareen | G06K 9/00369 345/419 |
| 2016/0138205 | A1 * | 5/2016 | Schweizer | D05B 19/08 700/137 |
| 2016/0292779 | A1 * | 10/2016 | Rose | G06T 13/40 |
| 2017/0061683 | A1 * | 3/2017 | Dorin | G06T 17/00 |
| 2017/0224039 | A1 * | 8/2017 | Chang | A41H 3/007 |
| 2017/0260671 | A1 * | 9/2017 | Suzuki | D05B 21/00 |
| 2017/0285593 | A1 * | 10/2017 | Critchfield | D05B 19/16 |
| 2017/0353711 | A1 * | 12/2017 | Wayenberg | H04N 13/221 |
| 2018/0025539 | A1 * | 1/2018 | Oh | A41H 3/007 345/420 |
| 2018/0044830 | A1 * | 2/2018 | Kadowaki | B25J 15/0019 |
| 2018/0080155 | A1 * | 3/2018 | Sano | D05B 19/12 |
| 2019/0122424 | A1 * | 4/2019 | Moore | G06T 7/50 |
| 2019/0311488 | A1 * | 10/2019 | Sareen | G06T 13/40 |

* cited by examiner

SEWING SYSTEM AND THREE-DIMENSIONAL MEASUREMENT DEVICE

CROSS-REFERENCE TO RELATED APPLICATIONS

The present application claims the benefit of priority of Japanese Patent Application No. 2018-097461, filed on May 21, 2018, the content of which is incorporated herein by reference.

TECHNICAL FIELD

The present invention relates to a sewing system and a three-dimensional measurement device.

BACKGROUND ART

Products, such as clothing, are produced by sewing a workpiece. An example of the related art is shown in Japanese Patent Publication No. 2001-317904.

SUMMARY OF INVENTION

In order to implement quality control of a product, it is necessary to recognize a state of a workpiece or a state of a produced product.

Aspects of the present invention aim to appropriately implement quality control of a product produced by sewing.

An aspect of the present invention is a sewing system which includes a sewing machine that sews a workpiece, and a three-dimensional measurement device that measures a three-dimensional shape of the workpiece.

Another aspect of the present invention is a sewing system which includes a sewing machine that sews a workpiece, and a three-dimensional measurement device that measures a three-dimensional shape of seams formed on the workpiece by the sewing machine.

According to an aspect of the present invention, it is possible to appropriately implement quality control of a product produced by sewing.

DESCRIPTION OF EMBODIMENTS

Hereinafter, embodiments of the present invention will be described with reference to the drawings, but the present invention is not limited thereto. Configuration elements of the embodiments which will be described hereinafter can be appropriately combined with each other. In addition, there is also a case where some configuration elements are not used.

In the embodiment, a positional relationship of each part will be described based on a local coordinate system defined in a sewing system 100. The local coordinate system is defined by an XYZ orthogonal coordinate system. A direction parallel to an X-axis within a predetermined plane is defined as an X-axis direction. A direction parallel to a Y-axis within a predetermined plane orthogonal to the X-axis is defined as a Y-axis direction. A direction parallel to a Z-axis orthogonal to a predetermined plane is defined as a Z-axis direction. A rotational direction or an inclination direction around the X-axis is referred to as a θX direction. A rotational direction or an inclination direction around the Y-axis is referred to as a θY direction. A rotational direction or an inclination direction around the Z-axis is referred to as a θZ direction. A plane including the X-axis and the Y-axis is referred to as an XY plane. The XY plane is parallel to a predetermined plane.

First Embodiment

<Sewing System>

Figure 1:
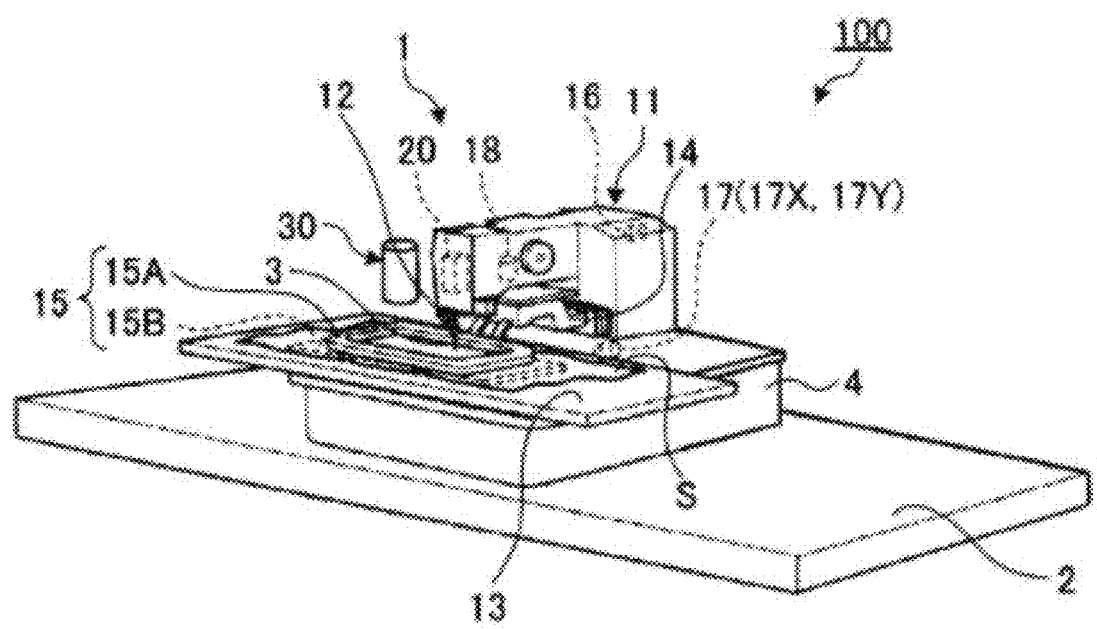
FIG. 1 is a perspective view illustrating an example of a sewing system according to an embodiment.
Figure 1:
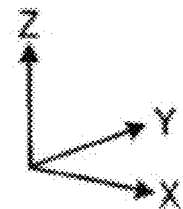
Figure 2:
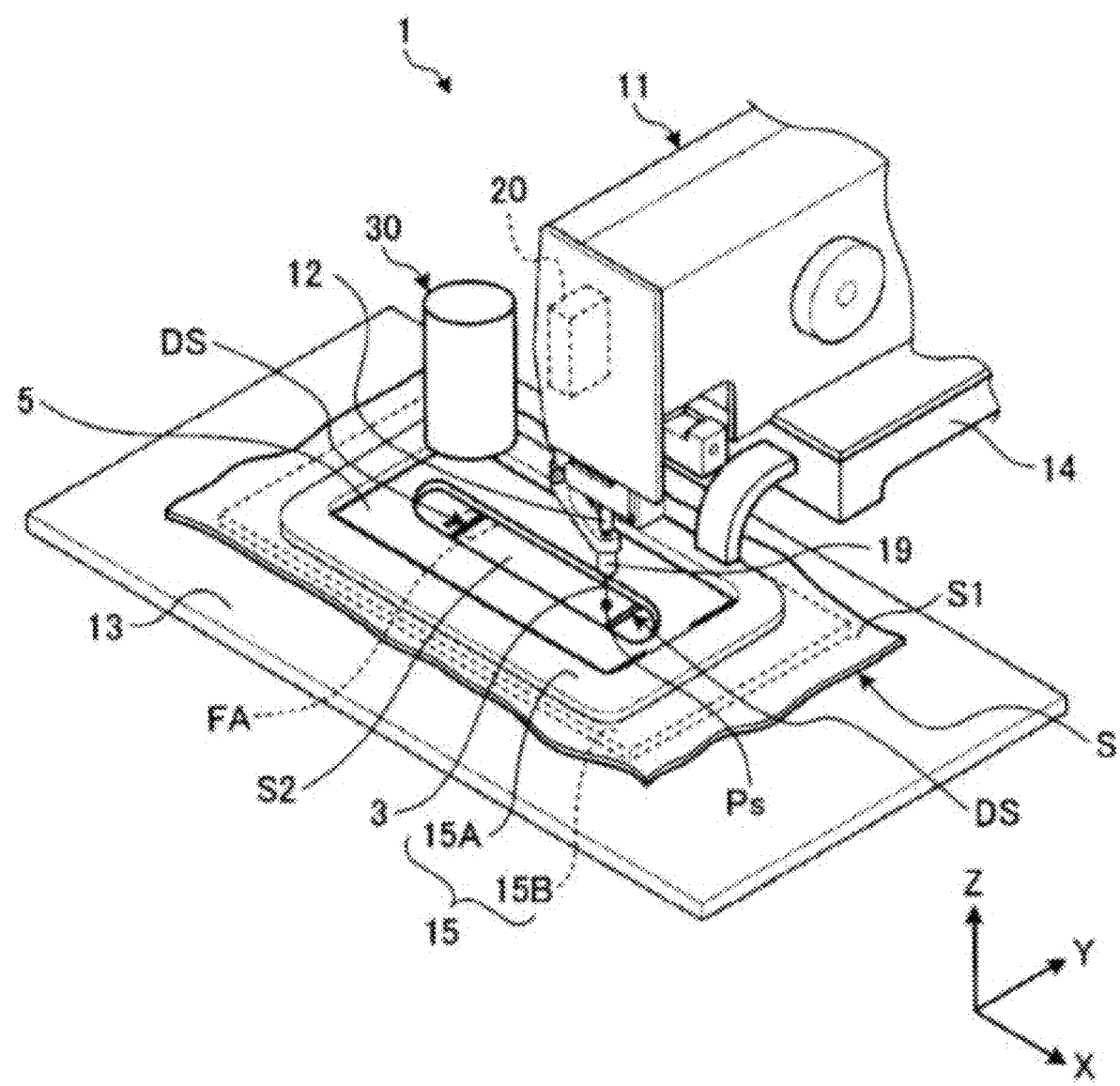
FIG. 2 is a perspective view illustrating a part of the sewing system according to the embodiment.

FIG. 1 is a perspective view illustrating an example of a sewing system 100 according to the embodiment. FIG. 2 is a perspective view illustrating a part of the sewing system 100 according to the embodiment. As illustrated in FIGS. 1 and 2, the sewing system 100 includes a sewing machine 1 for sewing a workpiece S and a three-dimensional measurement device 30. In the embodiment, the sewing machine 1 is an electronic cycle sewing machine.

The sewing machine 1 includes: a bed portion 4 supported by a table 2; a frame 11 supported by the bed portion 4; a needle bar 12 supported by the frame 11; a throat plate 13 supported by the bed portion 4; a holding member 15 that supports the workpiece S; an actuator 16 that generates power for moving the needle bar 12; an actuator 17 which generates power for moving the holding member 15; and an actuator 18 that generates power for moving at least a part of the holding member 15.

The needle bar 12 holds a needle 3. An upper thread UT is hung on the sewing machine needle 3. The needle bar 12 holds the needle 3 such that the needle 3 and the Z-axis are parallel to each other. The needle bar 12 is supported by the frame 11 to be movable in the Z-axis direction.

The throat plate 13 supports the workpiece S sewn by the needle 3. The throat plate 13 supports the holding member 15. The throat plate 13 is supported by the bed portion 4. The throat plate 13 is disposed below the holding member 15.

The holding member 15 holds the workpiece S. The holding member 15 can move while holding the workpiece S within the XY plane including a sewing position Ps immediately below the needle 3. The holding member 15 is supported by the bed portion 4 via a supporting member 14.

The holding member 15 includes a frame-shaped pressing member 15A and a lower plate 15B having the same frame shape. The pressing member 15A is movable in the Z-axis direction. The lower plate 15B is disposed below the pressing member 15A. The holding member 15 holds the workpiece S by sandwiching the workpiece S between the pressing member 15A and the lower plate 15B.

As the pressing member 15A moves in the +Z direction, the pressing member 15A and the lower plate 15B are separated from each other. Accordingly, an operator can dispose the workpiece S between the pressing member 15A and the lower plate 15B. As the pressing member 15A moves in the −Z direction in a state where the workpiece S is disposed between the pressing member 15A and the lower plate 15B, the workpiece S is sandwiched between the pressing member 15A and the lower plate 15B. Accordingly, the workpiece S is held by the holding member 15. In addition, as the pressing member 15A moves in the +Z direction, holding of the workpiece S by the holding member 15 is released.

A shuttle is disposed below the throat plate 13. The shuttle holds a bobbin accommodated in a bobbin case. The shuttle rotates in conjunction with the needle bar 12. The shuttle feeds a lower thread LT. The shuttle penetrates the workpiece S supported by the throat plate 13 and scoops up the upper thread UT from the needle 3 which has passed through a needle hole of the throat plate 13.

The actuator 16 generates power for moving the needle bar 12 and the shuttle. The actuator 16 includes a pulse motor. The power generated by the actuator 16 is transmitted to each of the needle bar 12 and the shuttle via a power transmission mechanism. As the power generated by the actuator 16 is transmitted to the needle bar 12, the needle bar 12 and the needle 3 held by the needle bar 12 reciprocate in the Z-axis direction. By transmitting the power generated by the actuator 16 to the shuttle, the shuttle rotates in conjunction with the needle bar 12. The sewing machine 1 sews the workpiece S in cooperation with the needle 3 held by the needle bar 12 and the shuttle.

The actuator 17 generates power for moving the holding member 15 within the XY plane. The actuator 17 includes a pulse motor. The actuator 17 includes an X-axis motor 17X which generates power for moving the holding member 15 in the X-axis direction and a Y-axis motor 17Y which generates power for moving the holding member 15 in the Y-axis direction. The actuator 17 is provided on the inside of the bed portion 4.

The power generated by the actuator 17 is transmitted to the holding member 15 via the supporting member 14. Accordingly, the holding member 15 can move in each of the X-axis direction and the Y-axis direction between the needle 3 and the throat plate 13. By the operation of the actuator 17, the holding member 15 can move while holding the workpiece S within the XY plane including the sewing position Ps immediately below the needle 3.

The actuator 18 generates power for moving the pressing member 15A of the holding member 15 in the Z-axis direction. The actuator 18 includes a pulse motor. As the pressing member 15A moves in the +Z direction, the pressing member 15A and the lower plate 15B are separated from each other. As the pressing member 15A moves in the −Z direction, the workpiece S is sandwiched between the pressing member 15A and lower plate 15B.

As illustrated in FIG. 2, in the embodiment, the workpiece S includes a first workpiece S1 and a second workpiece S2 disposed on the first workpiece S1. The holding member 15 holds the first workpiece S1 and the second workpiece S2 in a sandwiching manner.

A frame 5 is disposed on the inside of the pressing member 15A. The frame 5 has an opening. In the opening of the frame 5, a partial region of the workpiece S on which seams SE are formed is disposed.

An intermediate presser foot 19 has a cylindrical member with a hole that penetrates the needle 3 and is held at the minimum height from a front surface of the workpiece S without interfering with movement of the workpiece S on the XY plane. The intermediate presser foot 19 prevents the workpiece S from being pulled up together with the needle 3 when the needle 3 moves up and down by the needle bar 12. The change in height of the intermediate presser foot 19 is implemented by moving the intermediate presser foot 19 up and down with the actuator 20 that generates the power to move in the Z direction.

<Three-Dimensional Measurement Device>

The three-dimensional measurement device 30 measures a three-dimensional shape of a measurement target. In the embodiment, the measurement target of the three-dimensional measurement device 30 includes the workpiece S and the seams SE formed on the workpiece S by the sewing machine 1. The three-dimensional measurement device 30 measures the three-dimensional shape of the workpiece S and the three-dimensional shape of the seams SE formed on the workpiece S by the sewing machine 1.

The position of the three-dimensional measurement device 30 is fixed. A relative position of the three-dimensional measurement device 30 and the frame 11 is fixed. The three-dimensional measurement device 30 is disposed above the throat plate 13 and the holding member 15. The holding member 15 is movable within the XY plane including a measurement region FA of the three-dimensional measurement device 30. The three-dimensional measurement device 30 measures the measurement target held by the holding member 15. The measurement target held by the holding member 15 include the workpiece S and the seams SE formed on the workpiece S. In the embodiment, the three-dimensional measurement device 30 measures the workpieces S and the seams SE from above via the opening of the frame 5.

Figure 3:
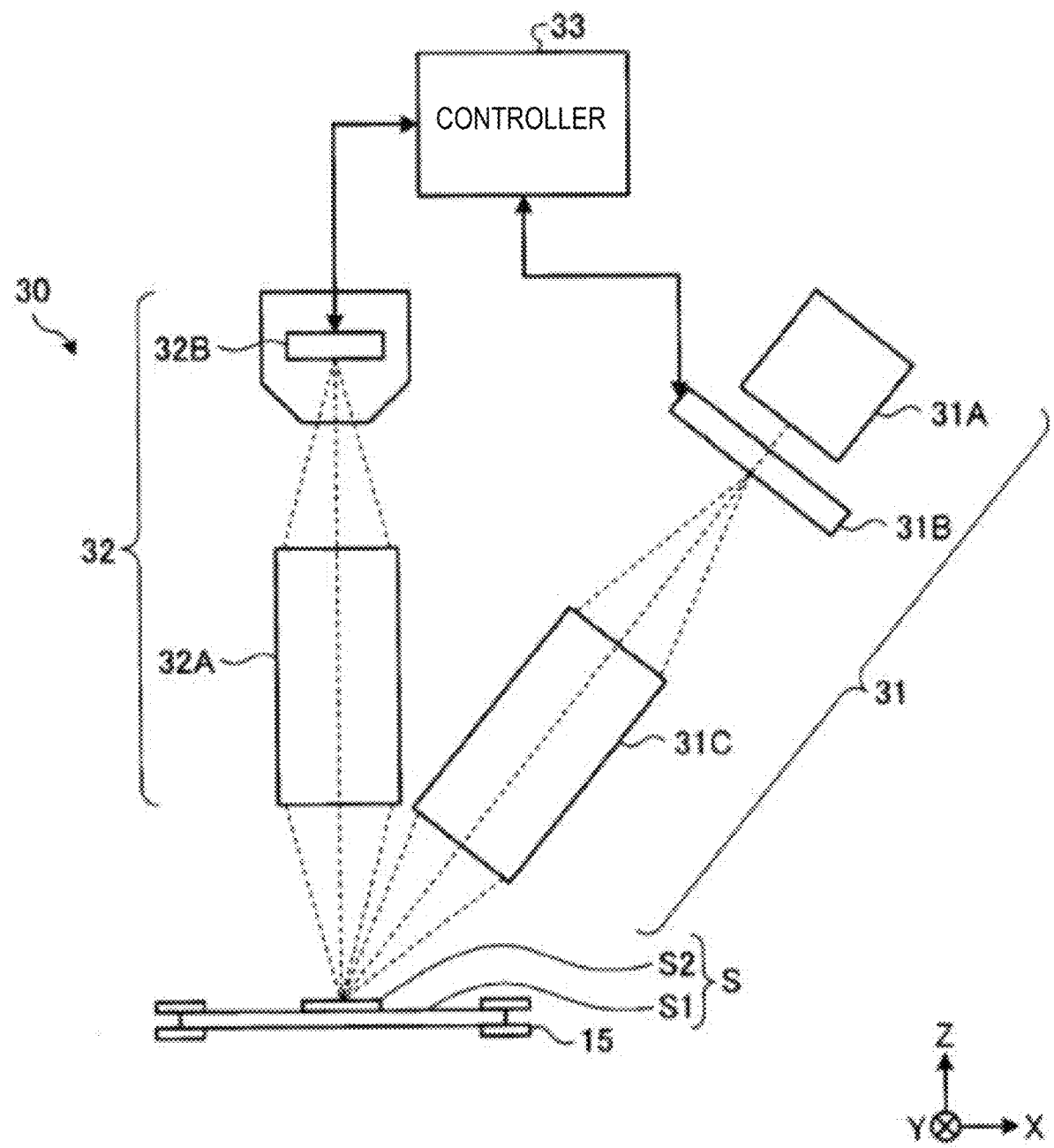
FIG. 3 is a view schematically illustrating a three-dimensional measurement device according to the embodiment.

FIG. 3 is a view schematically illustrating the three-dimensional measurement device 30 according to the embodiment. In the embodiment, the three-dimensional measurement device 30 measures the three-dimensional shape of the measurement target based on a phase shift method. In the description using FIG. 3, it is assumed that the measurement target of the three-dimensional measurement device 30 is the workpiece S.

As illustrated in FIG. 3, the three-dimensional measurement device 30 includes: a projection device 31 that projects a pattern onto the workpiece S held by the holding member 15; an imaging device 32 that acquires image data of the workpiece S onto which the pattern is projected; and a controller 33.

The projection device 31 includes: a light source 31A for generating light; a light modulation element 31B for modulating the light emitted from the light source 31A; and a projection optical system 31C for projecting the pattern light generated by the light modulation element 31B onto the workpiece S.

The light modulation element 31B includes a digital mirror device (DMD). In addition, the light modulation element 31B may include a transmission type liquid crystal panel or a reflection type liquid crystal panel. The light modulation element 31B generates the pattern light based on pattern data output from the controller 33. The projection device 31 irradiates the workpiece S with the pattern light patterned based on the pattern data.

The imaging device 32 includes: an imaging optical system 32A that images the pattern light reflected by the workpiece S; and an imaging element 32B that acquires the image data of the workpiece S through the imaging optical system 32A. The imaging element 32B is a solid-state imaging element that includes a complementary metal oxide semiconductor image sensor (CMOS image sensor) or a charge coupled device image sensor (CCD image sensor).

The controller 33 includes a computer system and controls the projection device 31 and the imaging device 32. The controller 33 includes: an arithmetic processing unit including a processor, such as a central processing unit (CPU); and a storage device including a memory, such as a read only memory (ROM) or a random access memory (RAM) and a storage. The arithmetic processing unit performs arithmetic processing according to a computer program stored in the storage device.

The projection device 31 irradiates the workpiece S with stripe pattern light having a sinusoidal lightness distribution as pattern light. The projection device 31 projects the stripe pattern light onto the workpiece S while shifting the phase of the stripe pattern light based on the phase shift method. The imaging device 32 acquires the image data indicating an image of the workpiece S onto which the stripe pattern light is projected.

<Control System>

Figure 4:
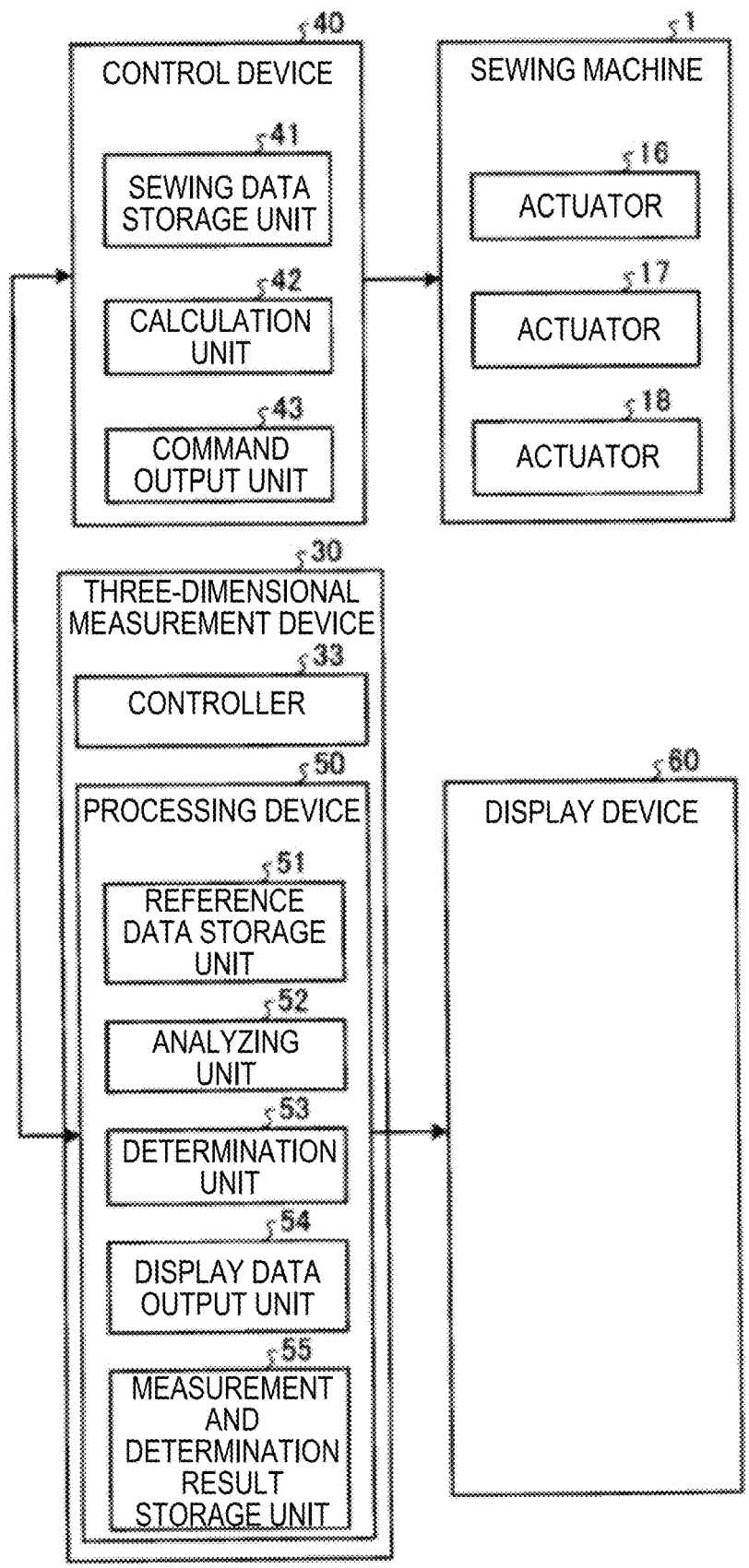
FIG. 4 is a functional block diagram illustrating a control system of the sewing system according to the embodiment.

FIG. 4 is a functional block diagram illustrating a control system of the sewing system 100 according to the embodiment. The sewing system 100 includes: the three-dimensional measurement device 30 that measures the three-dimensional shape of the measurement target; a control device 40 that controls the sewing machine 1; and a processing device 50 that detects the abnormality of the measurement target; and a display device 60.

The three-dimensional measurement device 30 acquires the measurement data indicating the three-dimensional shape of the workpiece S and the measurement data indicating the three-dimensional shape of the seams SE. The three-dimensional measurement device 30 outputs the measurement data of the workpiece S and the measurement data of the seams SE to the control device 40. Otherwise, sewing data (which will be described later) of the control device is acquired and used to control the three-dimensional measurement device 30.

The measurement data of the workpiece S includes position data indicating the position of the workpiece S within the XY plane, and height data indicating the position of the workpiece S in the Z-axis direction. The measurement data of the seams SE includes position data indicating the position of the seams SE within the XY plane, and height data indicating the position of the seams SE in the Z-axis direction.

The control device 40 includes a computer system and controls the sewing machine 1. The control device 40 has an arithmetic processing unit including a processor, such as a CPU, and a storage device including a memory, such as a ROM or a RAM. The arithmetic processing unit performs arithmetic processing according to a computer program stored in the storage device.

The control device 40 outputs a control command for controlling the sewing machine 1 based on the measurement data of the workpiece S output from the three-dimensional measurement device 30.

The control device 40 includes a sewing data storage unit 41, a calculation unit 42, and a command output unit 43.

The sewing data storage unit 41 stores the sewing data. The sewing data includes operating conditions of the sewing machine 1. As the operating conditions of the sewing machine 1, at least one of a target moving speed of the needle bar 12, a target moving condition of the holding member 15, a target pattern SEr of the seams SE formed on the workpiece S, a target position of the seams SE in the local coordinate system, a target position of the intermediate presser foot 19 in Z-axis direction, and a target tension of the upper thread UT is illustrated. The moving condition of the holding member 15 includes at least one of a target moving distance, a target moving speed, a target moving direction, and a target movement track of the holding member 15 within the XY plane. The sewing data is determined in advance. The sewing data is stored in the sewing data storage unit 41.

The calculation unit 42 corrects the sewing data based on the measurement data of the workpiece S output from the three-dimensional measurement device 30.

For example, the calculation unit 42 corrects the target moving speed of the needle bar 12 such that the seams SE are smoothly formed on the workpiece S based on at least one of the position data and the height data of the workpiece S acquired by the three-dimensional measurement device 30.

In addition, the calculation unit 42 corrects the target moving condition of the holding member 15 such that the seams SE are formed at the target position of the workpiece S based on the position data of the workpiece S acquired by the three-dimensional measurement device 30.

In addition, the calculation unit 42 corrects the target position of the pressing member 15A in the Z-axis direction in order to prevent the workpiece S from being pulled up together with the needle 3 and in order to hold the workpiece S to the minimum height from the front surface of the workpiece S without interrupting the movement of the workpiece S in the XY plane, based on the height data of the workpiece S acquired by the three-dimensional measurement device 30.

The command output unit 43 outputs the control command for controlling the sewing machine 1 based on the sewing data.

For example, the command output unit 43 outputs the control command to the actuator 16 such that the needle bar 12 moves at the target moving speed of the needle bar 12 defined in the sewing data. In a case where the target moving speed of the needle bar 12 is corrected in the calculation unit 42, the command output unit 43 outputs the control command to the actuator 16 such that the needle bar 12 moves at the corrected target moving speed.

In addition, the command output unit 43 outputs the control command to the actuator 17 such that the holding member 15 moves under the target moving condition of the holding member 15 defined in the sewing data. In a case where the target moving speed of the holding member 15 is corrected in the calculation unit 42, the command output unit 43 outputs the control command to the actuator 17 such that the holding member 15 moves under the corrected target moving condition.

Further, the command output unit 43 outputs the control command to the actuator 20 such that the intermediate presser foot 19 is disposed at the target position of the intermediate presser foot 19 in the Z-axis direction defined in the sewing data. In a case where the target position of the pressing member 15A is corrected in the calculation unit 42, the command output unit 43 outputs the control command to the actuator 20 such that the pressing member 15A is disposed at the corrected target position.

The processing device 50 includes a computer system and detects the abnormality of at least one of the workpiece S and the seams SE. The processing device 50 has an arithmetic processing unit including a processor, such as a CPU, and a storage device including a memory and a storage, such as a ROM or a RAM. The arithmetic processing unit performs arithmetic processing according to a computer program stored in the storage device.

The processing device 50 detects the abnormality of the workpiece S based on the measurement data of the workpiece S output from the three-dimensional measurement device 30. In addition, the processing device 50 detects the abnormality of the seams SE based on the measurement data of the workpiece S output from the three-dimensional measurement device 30.

The processing device 50 includes a reference data storage unit 51, an analyzing unit 52, a determination unit 53, a display data output unit 54, and a data storage unit 55.

The reference data storage unit 51 stores reference data indicating a feature amount of the three-dimensional shape of a normal workpiece S. Further, the reference data storage unit 51 stores the reference data indicating the feature amount of the three-dimensional shape of the seams SE when normal seams SE are formed. The reference data is design data of the workpiece S or known data that can be derived from preliminary experiments (including simulation experiments), and is stored in advance in the reference data storage unit 51.

The analyzing unit 52 analyzes the measurement data of the workpiece S output from the three-dimensional measurement device 30, and calculates feature amount data of the three-dimensional shape of the workpiece S. In addition, the analyzing unit 52 analyzes the measurement data of the seams SE output from the three-dimensional measurement device 30, and calculates the feature amount data indicating the feature amount of the three-dimensional shape of the seams SE. The feature amount data includes the step position (X, Y, and Z directions) of the workpiece S, the height of a sewing range of the workpiece S itself, the height of a step DS of the workpiece S, the thickness of the thread, the height of the sewing thread, the height of the seams SE, the shape of the seams SE, the sewing pitch, and the like.

The determination unit 53 collates the feature amount data calculated in the analyzing unit 52 with the reference data stored in the reference data storage unit 51 to determine the abnormality of the workpiece S and the abnormality of the seams SE. The determination of the abnormality of the workpiece S includes the determination of the presence or absence of the abnormality of the workpiece S and the determination of the pattern of the abnormality of the workpiece S. The determination of the abnormality in the seams SE includes the determination of the presence or absence of abnormality of the seams SE and the determination of the pattern of the abnormality of the seams SE.

The display data output unit 54 generates the display data displayed on the display device 60, and outputs the display data to the display device 60. The display data includes the display data indicating the three-dimensional shape of the workpiece S, the display data indicating the three-dimensional shape of the seams SE, and the determination data by the determination unit 53.

The measurement and determination result storage unit 55 stores the measurement data, the feature amount data, the determination data, a sewing machine ID acquired from the control device, the sewing data, the date and time of the sewing data, and the like.

The display device 60 displays the display data output from the display data output unit 54. The display device includes a flat panel display, such as a liquid crystal display (LCD) or an organic electroluminescence display (OELD).

<Workpiece>

Figure 5:
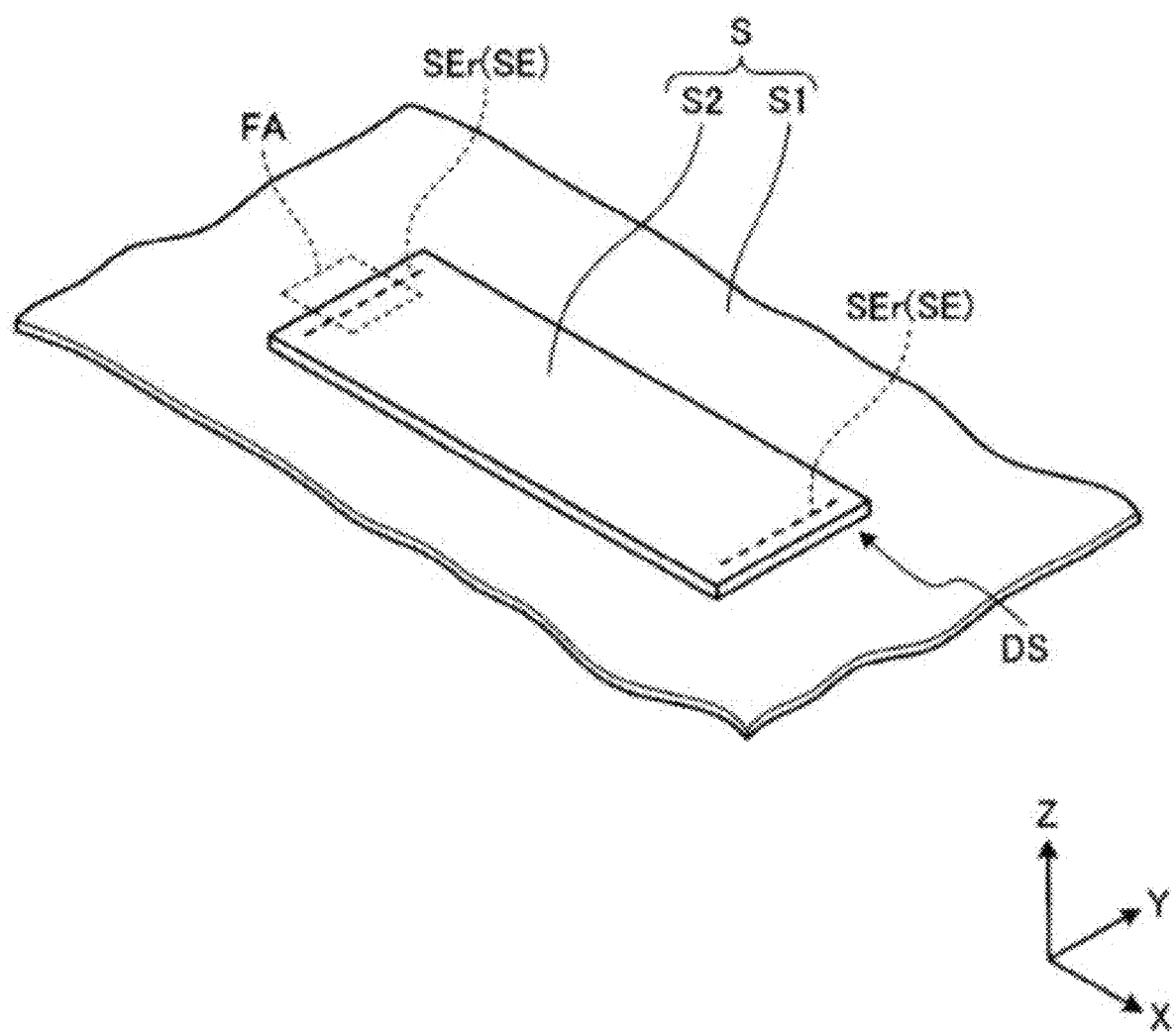
FIG. 5 is a perspective view illustrating an example of a workpiece according to the embodiment.

FIG. 5 is a perspective view illustrating an example of the workpiece S according to the embodiment. The workpiece S includes a first workpiece S1 and a second workpiece S2 disposed on the first workpiece S1. The step DS is formed between the first workpiece S1 and the second workpiece S2. In other words, in the embodiment, the front surface of the workpiece S includes the step DS.

The sewing data includes the target position of the seams SE in the local coordinate system. In other words, as illustrated in FIG. 5, the position of the target pattern SEr of the seams SE is defined in the local coordinate system such that the seams SE are formed at an edge of the second workpiece S2. The sewing data is defined in advance and stored in the sewing data storage unit 41.

The three-dimensional measurement device 30 can accurately measure the position within the XY plane of the step DS provided on the front surface of the workpiece S with high accuracy. For example, even in a case where the color of the first workpiece S1 and the color of the second workpiece S2, which are difficult to be determined with a normal two-dimensional imaging device, are the same as each other, the three-dimensional measurement device 30 can measure the step DS with high accuracy. Further, the three-dimensional measurement device 30 can measure the height of the step DS of the workpiece S with high accuracy.

<Sewing Processing>

Figure 6:
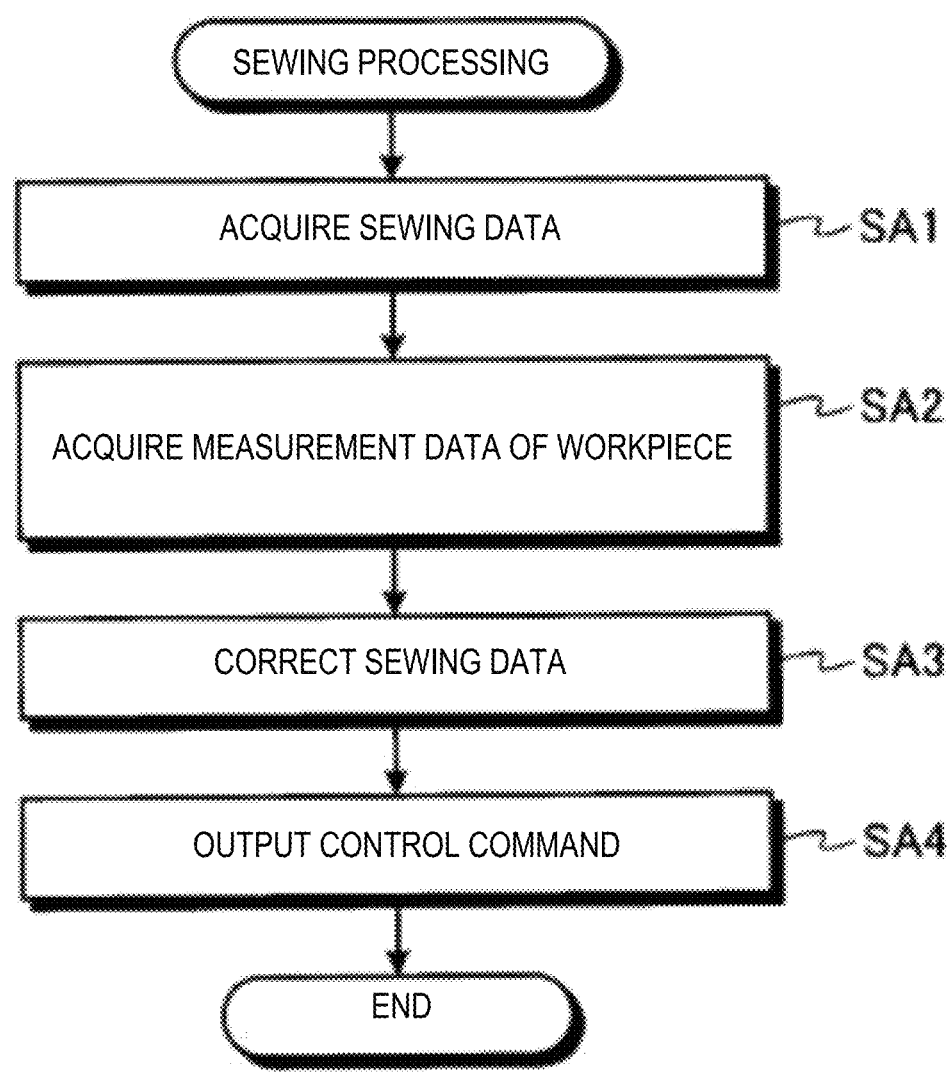
FIG. 6 is a flowchart illustrating sewing processing according to the embodiment.

FIG. 6 is a flowchart illustrating sewing processing according to the embodiment. The sewing data is stored in advance in the sewing data storage unit 41. The calculation unit 42 acquires the sewing data from the sewing data storage unit 41 (step SA1).

The workpiece S is installed in the holding member 15. The three-dimensional measurement device 30 measures the three-dimensional shape of the workpiece S before being sewn by the sewing machine 1. The measurement data of the workpiece S measured by the three-dimensional measurement device 30 is output to the control device 40. As illustrated in FIG. 5, in a case where the front surface of the workpiece S includes the step DS, the measurement data of the workpiece S includes the step data indicating the position and the height of the step DS. The calculation unit 42 acquires the measurement data of the workpiece S from the three-dimensional measurement device 30 (step SA2).

The calculation unit 42 corrects the sewing data based on the measurement data of the workpiece S acquired from the three-dimensional measurement device 30 (step SA3). In other words, the calculation unit 42 corrects the sewing data based on the measurement data of the workpiece S acquired before being sewn by the sewing machine 1. In a case where the measurement data of the workpiece S includes the step data, the calculation unit 42 corrects the sewing data based on the step data.

For example, in a case where it is determined that the sewing processing cannot be normally performed based on the sewing data stored in the sewing data storage unit 41 with reference to the measurement data of the workpiece S, the calculation unit 42 corrects the sewing data.

The command output unit 44 outputs the control command to the sewing machine 1 based on the corrected sewing data corrected by the calculation unit 42 (step SA4).

The control command output from the command output unit 44 based on the corrected sewing data includes an adjustment command of the relative position of the needle 3 and the workpiece S within the XY plane. The command output unit 44 outputs the control command for moving the holding member 15 such that the edge of the second workpiece S2 is transferred to the sewing position Ps immediately below the needle 3 based on the step data, and the seams SE are formed along the edge of the second workpiece S2.

<Abnormality Processing>

Figure 7:
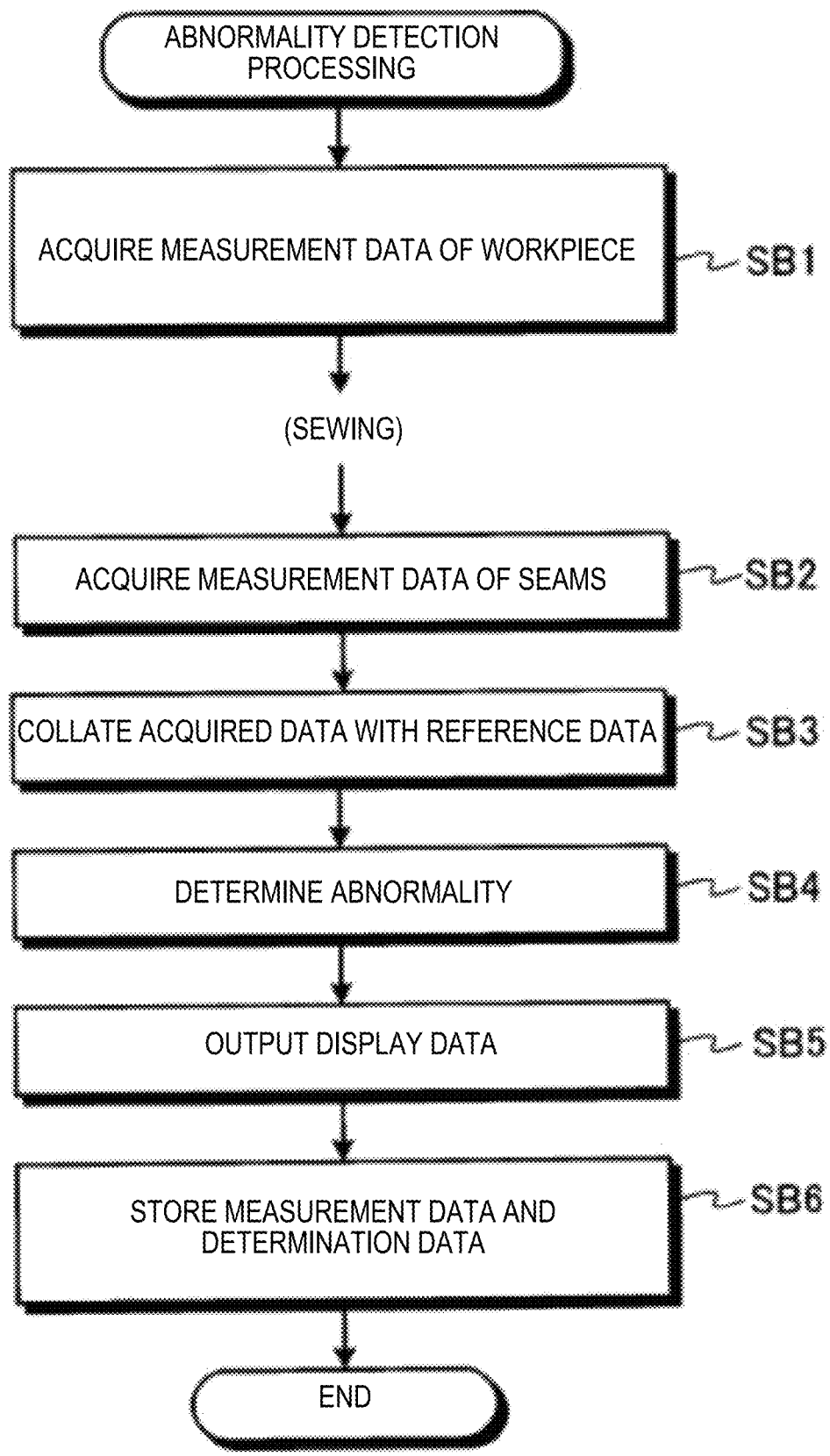
FIG. 7 is a flowchart illustrating abnormality detecting processing according to the embodiment.

FIG. 7 is a flowchart illustrating abnormality detecting processing according to the embodiment. The three-dimensional measurement device 30 measures the three-dimensional shape of the workpiece S before being sewn by the sewing machine 1. The measurement data of the workpiece S measured by the three-dimensional measurement device 30 is output to the processing device 50. As illustrated in FIG. 5, in a case where the front surface of the workpiece S includes the step DS, the measurement data of the workpiece S includes the step data indicating the position and the height of the step DS. The analyzing unit 52 acquires the measurement data of the workpiece S from the three-dimensional measurement device 30 (step SB1).

By this step, it is possible to detect the abnormality of the workpiece S itself after the sewing, for example, by comparing the measurement data with measurement data by the three-dimensional measurement device 30 after the sewing indicated in the subsequent steps. In addition, the step will be omitted and the processing may be started after the next step (sewing).

After the sewing processing is performed, the three-dimensional measurement device 30 measures the three-dimensional shape of the seams SE formed on the workpiece S by the sewing machine 1. The measurement data of the seams SE measured by the three-dimensional measurement device 30 is output to the processing device 50. The analyzing unit 52 acquires the measurement data of the seams SE from the three-dimensional measurement device 30 (step SB2).

The analyzing unit 52 calculates the feature amount data indicating the feature amount of the three-dimensional shape of the seams SE formed on the workpiece S by the sewing machine 1 based on the measurement data of the seams SE acquired from the three-dimensional measurement device 30.

The determination unit 53 collates the feature amount data calculated in the analyzing unit 52 with the reference data stored in the reference data storage unit 51 (step SB3).

The determination unit 53 collates the feature amount data with the reference data to determine the abnormality of the seams SE (step SB4). The determination of the abnormality of the seams SE includes the determination of the presence or absence of abnormality of the seams SE and the determination of the pattern of the abnormality of the seams SE.

The display data output unit 54 generates the display data displayed on the display device 60, and outputs the display data to the display device 60 (step SB5). The display data includes the display data sterically indicating the three-dimensional shape of the workpiece SE, and the determination data by the determination unit 53.

The measurement and determination result storage unit 55 stores the measurement data, the feature amount data, or the determination data (step SB6). At this time, the sewing machine ID from the control device, the sewing data, the date and time of the sewing data, and the like are acquired and stored in association with each other.

In a case where the abnormality occurs in the shape of the seams SE, the three-dimensional measurement device 30 can measure the abnormality in the shape of the seams SE. The processing device 50 can detect the abnormality of the seams SE based on the measurement data of the seams SE. For example, it is possible to detect seam defects (stitch skip) or stitch pitch abnormalities from the position data of the seams SE. In addition, from the feature amount data of thickness and height of the thread, it is also possible to distinguish differences in thread type or abnormal sewing. The three-dimensional measurement device 30, for example, can reliably recognize the seams SE even in a case where the color of the upper thread UT and the color of the workpiece S2 are the same as each other and are difficult to be distinguished from each other with a normal two-dimensional imaging device, and can perform detection with high accuracy.

The measurement data of the seams SE includes the height data of the seams SE. For example, in a case where the upper thread UT or the lower thread LT that forms the seams SE is loosened and protrudes from the front surface of the workpiece S, the three-dimensional measurement device 30 can detect the protruding seams SE with high accuracy. The processing device 50 can determine the abnormality of the seams SE based on the height data of the seams SE with high accuracy.

Figure 8:
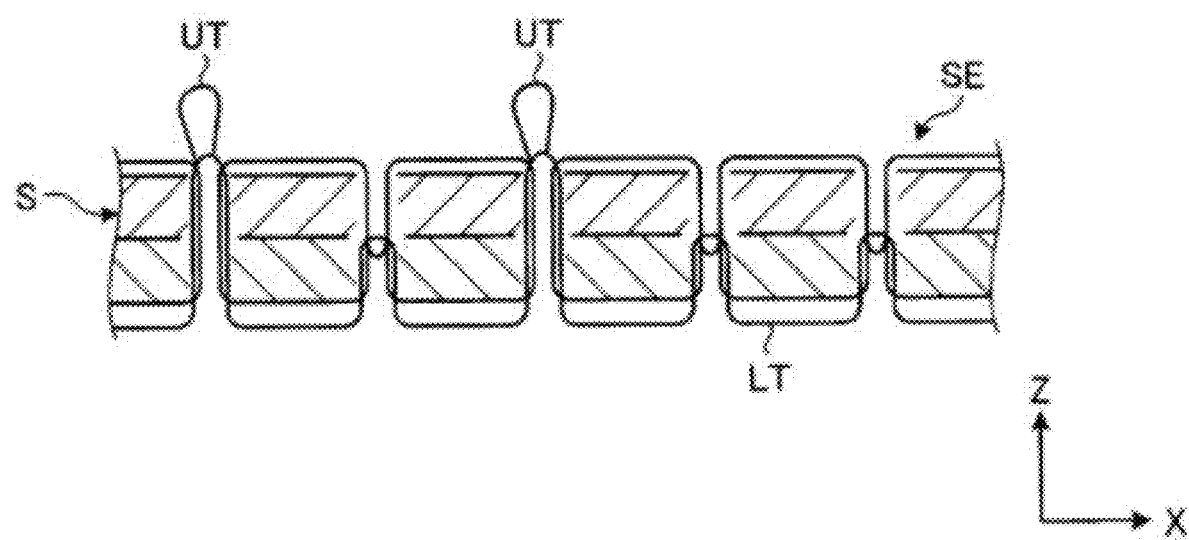
FIG. 8 is a view illustrating an example of an abnormality of seams.

FIG. 8 is a view illustrating an example of the abnormality of seams SE. FIG. 8 illustrates an abnormality in a pattern in which at least one of the upper thread UT and the lower thread LT is loosened on the workpiece S. The abnormality of the seams SE illustrated in FIG. 8 is called a "lantern pattern". The "lantern pattern" refers to a phenomenon in which the upper thread UT and the lower thread LT are hung, but the upper thread UT is loosened on the front surface of the workpiece S and the lower thread LT is loosened on the rear surface of the workpiece S. FIG. 8 illustrates an example in which the upper thread UT is loosened on the front surface of the workpiece S.

The reference data storage unit 51 stores the shape of normal seams SE as reference data. The analyzing unit 52 calculates the feature amount data indicating the "lantern pattern" based on the measurement data of the seams SE. The determination unit 53 can determine that the pattern of the abnormality of the seams SE is a "lantern pattern" by collating the reference data with the feature amount data.

The display device 60 displays the measurement data of the workpiece S and the measurement data of the seams SE. Since the three-dimensional data of the workpiece S and the seams SE are displayed on the display device 60, the operator can intuitively recognize the state of the workpiece S and the seams SE by looking at the display device 60.

In the embodiment, the three-dimensional measurement device 30 can measure not only the three-dimensional shape of the seams SE but also the three-dimensional shape of the workpiece S after being sewn by the sewing machine 1. For example, in a case where the abnormality occurs in the shape of the workpiece S by the sewing processing, the three-dimensional measurement device 30 can measure the abnormality in the shape of the workpiece S. The analyzing unit 52 can calculate the feature amount data indicating the feature amount of the three-dimensional shape of the workpiece S after being sewn by the sewing machine 1 based on the measurement data of the workpiece S acquired from the three-dimensional measurement device 30. In the reference data storage unit 51, the reference data indicating the three-dimensional shape of the normal workpiece S sewn by the sewing machine 1 is stored. The determination unit 53 can collate the feature amount data of the workpiece S after being sewn by the sewing machine 1 with the reference data to determine the abnormality of the workpiece S after being sewn by the sewing machine 1. The determination of the abnormality of the workpiece S includes the determination of the presence or absence of the abnormality of the workpiece S and the determination of the pattern of the abnormality of the workpiece S.

<Effects>

As described above, according to the embodiment, the sewing system 100 is provided with the three-dimensional measurement device 30. The three-dimensional measurement device 30 can measures the three-dimensional shape of the workpiece S. The three-dimensional measurement device 30 can measure the three-dimensional shape of the workpiece S before being sewn by the sewing machine 1 and the three-dimensional shape of the workpiece S after being sewn by the sewing machine 1. In addition, the three-dimensional measurement device 30 can measure the three-dimensional shape of the seams SE formed on the workpiece S by the sewing machine 1. Since the three-dimensional shape of the workpiece S and the three-dimensional shape of the seams SE are measured, the state of the workpiece S or the state of the produced product can be appropriately recognized. Therefore, it is possible to appropriately implement quality control of a product produced by the sewing.

The control device 40 outputs the control command for controlling the sewing machine 1 based on the measurement data of the workpiece S output from the three-dimensional measurement device 30. The control device 40 outputs the control command based on the measurement data of the workpiece S acquired before being sewn by the sewing machine 1. Accordingly, the sewing machine 1 can be appropriately operated based on the three-dimensional shape of the workpiece S. Therefore, products having high quality are produced.

In the embodiment, even in a case where the front surface of the workpiece S includes the step DS, the three-dimensional shape of the front surface of the workpiece S including the step DS is measured by the three-dimensional measurement device 30. The measurement data of the workpiece S includes the step data indicating the position and height of the step DS. The control device 40 can output the control command for controlling the sewing machine 1 based on the step data. Accordingly, the sewing machine 1 can be appropriately operated based on the step data of the workpiece S. Therefore, products having high quality are produced.

In the embodiment, the control command for controlling the sewing machine 1 includes the adjustment command of the relative position of the needle 3 and the workpiece S within the XY plane. Accordingly, the seams SE can be formed at the target position of the workpiece S.

Further, in the embodiment, the processing device 50 can detect the abnormality of the workpiece S based on the measurement data of the workpiece S acquired from the three-dimensional measurement device 30 before being sewn by the sewing machine 1. In addition, the processing device 50 can detect the abnormality of the workpiece S based on the measurement data of the workpiece S or the seams SE acquired from the three-dimensional measurement device 30 before being sewn by the sewing machine 1. Accordingly, it is possible to appropriately recognize the state of the workpiece S or the state of the produced product. Therefore, it is possible to appropriately implement quality control of a product produced by the sewing.

In the embodiment, since the three-dimensional shape of the seams SE is measured by the three-dimensional measurement device 30, the height data of the seams SE is acquired as measurement data of the seams SE. Accordingly, the processing device 50 can determine the abnormality of the seams SE based on the height data of the seams SE with high accuracy. For example, even in a case where a "lantern pattern" is generated as the abnormality of the seams SE, the processing device 50 can detect the generation of "lantern pattern" with high accuracy.

In the embodiment, the display device 60 displays the measurement data of the workpiece S and the measurement data of the seams SE. Accordingly, the operator can intuitively recognize the state of the workpiece S and the seams SE by looking at the display device 60. Further, by displaying the determination data of the determination unit 53 of the processing device 50 on the display device 60, the operator can recognize the presence or absence of the abnormality that occurs in the workpiece S or the product and the pattern of the abnormality.

In the embodiment, the measurement data after the sewing or the determination data is stored in the measurement and determination result storage unit 55 by acquiring the sewing machine ID, the sewing data, the date and time of the sewing data, and the like from the control device 40 in association with each other, and accordingly, by verifying the determination result of the presence or absence of the sewing defect or the state of the sewing in a case where there is any defect in the product after the sewing, it is possible to manage so-called traceability.

In addition, in the embodiment, the three-dimensional measurement device 30 may measure the three-dimensional shape of the workpiece S or the three-dimensional shape of the seams SE in a state where the workpiece S is being sewn by the needle 3.

Second Embodiment

A second embodiment will be described. In the following description, the same reference numerals will be given to the same or equivalent configuration elements as those in the above-described embodiment, and the description thereof will be simplified or omitted.

Figure 9:
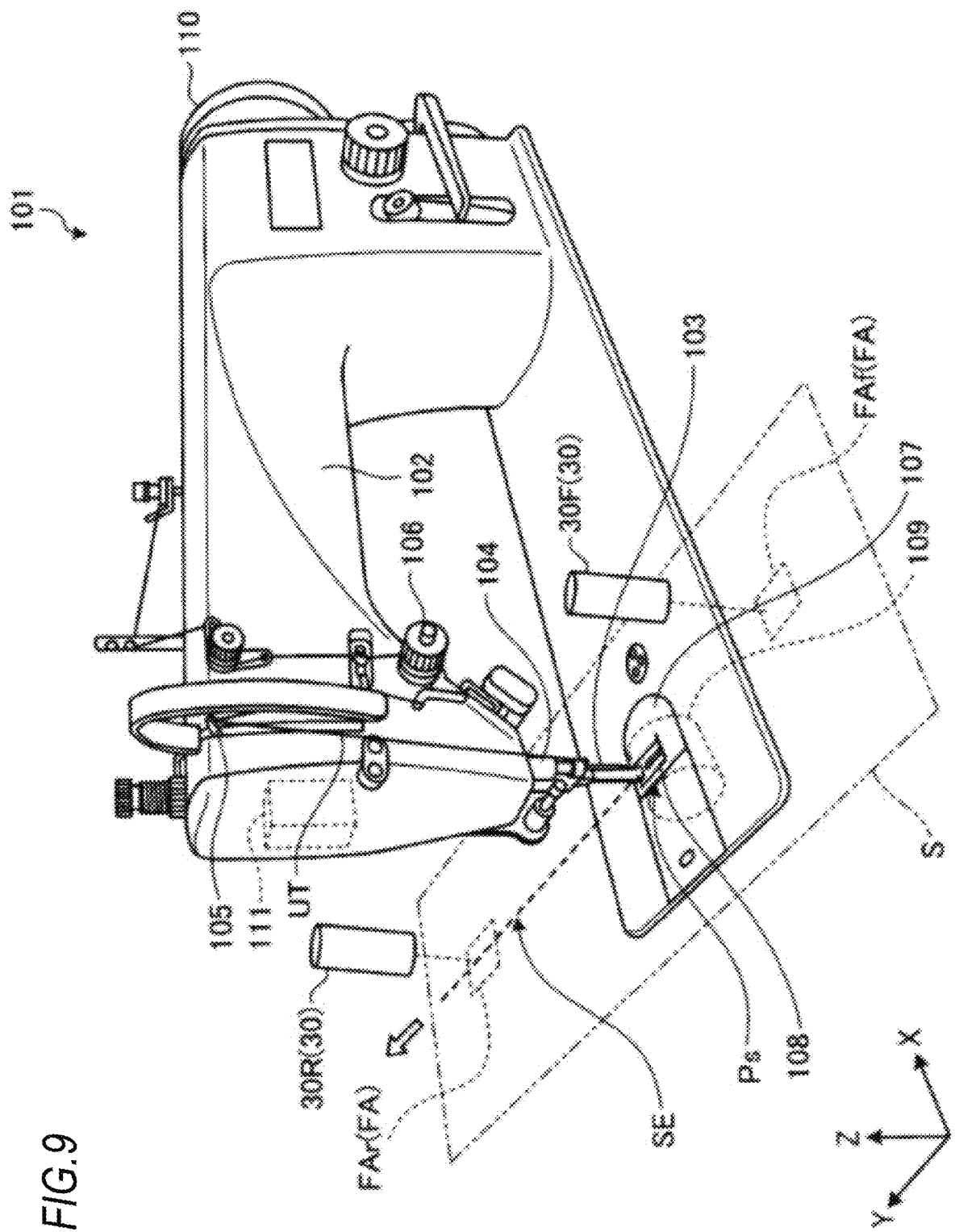
FIG. 9 is a perspective view illustrating a sewing machine according to the embodiment.
Figure 10:
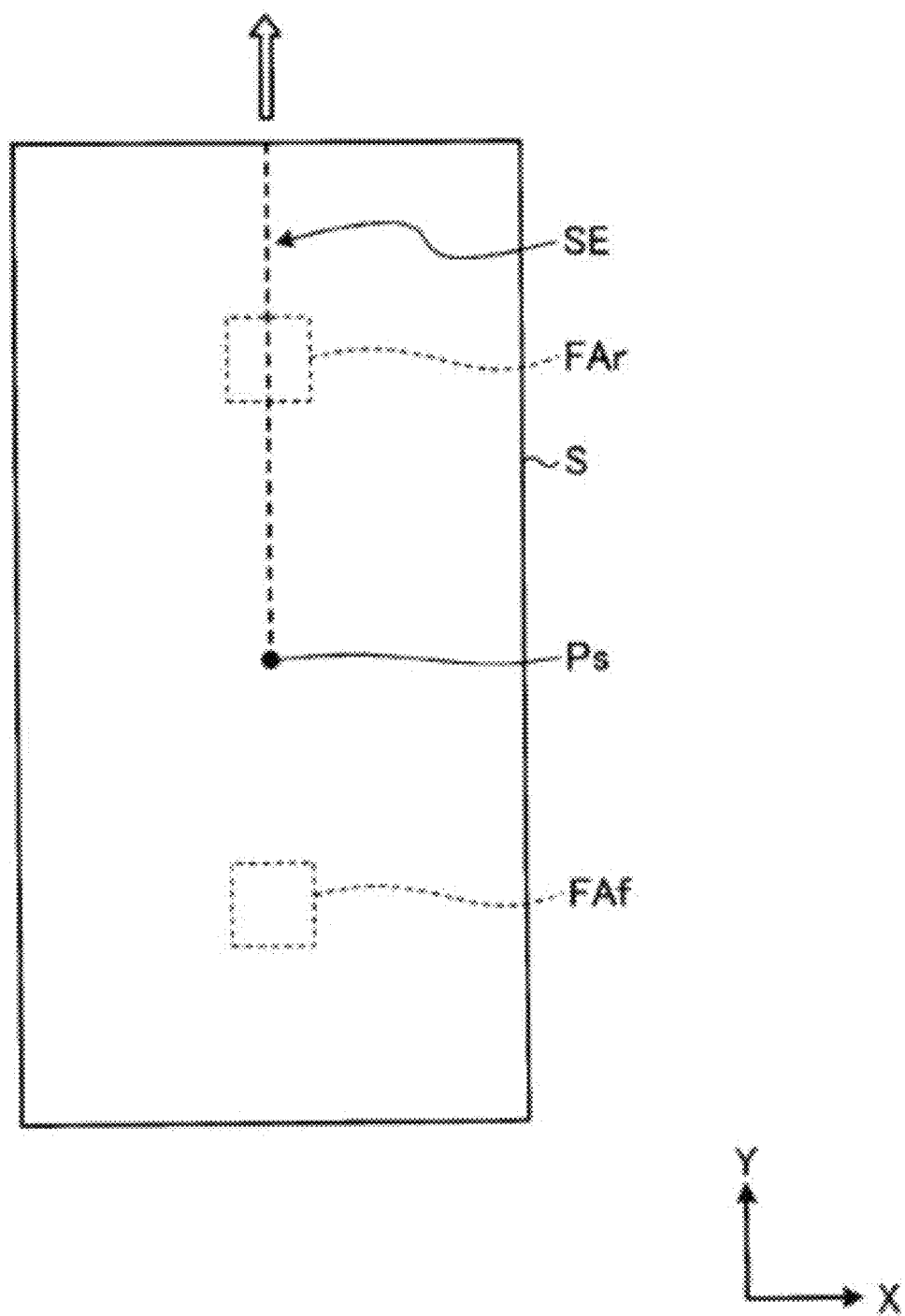
FIG. 10 is a plan view illustrating a relationship between a measurement region of the three-dimensional measurement device according to the embodiment and the workpiece.

FIG. 9 is a perspective view illustrating a sewing machine 101 according to the embodiment. FIG. 10 is a plan view illustrating a relationship between a measurement region FA of the three-dimensional measurement device 30 according to the embodiment and the workpiece S. In the embodiment, the sewing machine 101 is a lockstitch sewing machine that performs lockstitch.

As illustrated in FIG. 9, the sewing machine 101 includes a sewing machine head 102, a needle bar 104, a thread take-up lever 105, a thread tensioner 106, a throat plate 107, a pressing member 108, a shuttle 109, and a motor 110.

The needle bar 104 holds the needle 103 and reciprocates in the Z-axis direction. The needle bar 104 holds the needle 3 such that the needle 3 and the Z-axis are parallel to each other. The needle bar 104 is supported by the sewing machine head 102. The needle bar 104 is disposed above the throat plate 107 and can face the front surface of the workpiece S. The upper thread UT is hung on the needle 103. The needle 103 has a threading hole through which the upper thread UT passes. The needle 103 holds the upper thread UT on an inner surface of the threading hole. As the needle bar 104 reciprocates in the Z-axis direction, the needle 103 reciprocates in the Z-axis direction in a state of holding the upper thread UT.

The thread take-up lever 105 feeds the upper thread UT to the needle 103. The thread take-up lever 105 is supported by the sewing machine head 102. The thread take-up lever 105 has a thread take-up lever hole through which the upper thread UT passes. The thread take-up lever 105 holds the upper thread UT on an inner surface of the thread take-up lever hole. The thread take-up lever 105 reciprocates in the Z-axis direction in a state of holding the upper thread UT. The thread take-up lever 105 reciprocates in conjunction with the needle bar 104. The thread take-up lever 105 feeds and pulls up the upper thread UT by reciprocating in the Z-axis direction.

The thread tensioner 106 applies tension to the upper thread UT. The upper thread UT is fed to the thread tensioner 106 from a thread feed source. In the path through which the upper thread UT passes, the thread take-up lever 105 is disposed between the needle 103 and the thread tensioner 106. The thread tensioner 106 adjusts the tension of the upper thread UT supplied to the needle 103 via the thread take-up lever 105.

The throat plate 107 supports the workpiece S. The needle 103 held by the needle bar 104 and the throat plate 107 face each other. The throat plate 107 has a needle hole through which the needle 103 can pass. The needle 103 that penetrates the workpiece S supported by the throat plate 107 passes through the needle hole.

Below the throat plate 107, a feed dog (not illustrated) for sending the workpiece S in a +Y direction is provided, and the workpiece S is pressed against the feed dog by a pressing force of the pressing member 108 and conveyed in the +Y direction. The change in height of the pressing member 108 is implemented by moving the pressing member 108 up and down with an actuator 111 that generates the power for moving the pressing member 108 in the Z direction.

The shuttle 109 holds a bobbin accommodated in a bobbin case. The shuttle 109 is disposed below the throat plate 107. The shuttle 109 rotates in conjunction with the needle bar 104. The shuttle 109 feeds the lower thread LT. The shuttle 109 penetrates the workpiece S supported by the throat plate 107 and scoops up the upper thread UT from the needle 103 which has passed through the needle hole of the throat plate 107.

The motor 110 generates power. The motor 110 includes a stator supported by the sewing machine head 102 and a rotor rotatably supported by the stator. As the rotor rotates, the motor 110 generates power. The power generated by the motor 110 is transmitted to each of the needle bar 104, the thread take-up lever 105, and the shuttle 109 via a power transmission mechanism (not illustrated). The needle bar 104, the thread take-up lever 105, and the shuttle 109 are in conjunction with each other. As the power generated by the motor 110 is transmitted to the needle bar 104, the needle bar 104 and the needle 103 held by the needle bar 104 reciprocate in the Z-axis direction. By transmitting the power generated by the motor 110 to the thread take-up lever 105, the thread take-up lever 105 reciprocates in the Z-axis direction in conjunction with the needle bar 104. By transmitting the power generated by the motor 110 to the shuttle 109, the shuttle 109 rotates in conjunction with the needle bar 104 and the thread take-up lever 105. The sewing machine 101 sews the workpiece S in cooperation with the needle 103 held by the needle bar 104 and the shuttle 109.

The upper thread UT from the thread feed source is hung on the thread tensioner 106 and then hung on the needle 3 via the thread take-up lever 105. When the motor 110 rotates and the needle bar 104 is lowered, the needle 103 held in the needle bar 104 penetrates the workpiece S and passes through the needle hole provided on the throat plate 107. When the needle 103 passes through the needle hole of the throat plate 107, the lower thread LT fed from the shuttle 109 is hung on the upper thread UT hung on the needle 103. In a state where the lower thread LT is hung on the upper thread UT, the needle 3 is raised and leaves the workpiece S. When the needle 103 penetrates the workpiece S, the sewing machine 101 stops the workpiece S. When the needle 103 left the workpiece S, the sewing machine 101 moves the workpiece S in the +Y direction. The sewing machine 101 reciprocates the needle 103 while repeatedly moving and stopping the workpiece S in the +Y direction and forms the seams SE on the workpiece S. The seams SE formed on the workpiece S extend in the Y-axis direction.

As illustrated in FIGS. 9 and 10, a specified region of the front surface of the workpiece S is sewn by being transferred to the sewing position Ps immediately below the needle 103. In the embodiment, the three-dimensional measurement device 30 includes a front-side three-dimensional measurement device 30F for measuring the specified region before being transferred to the sewing position Ps, and a rear-side three-dimensional measurement device 30R for measuring the specified region after being transferred to the sewing position Ps and sewn by the needle 103. The specified region of the front surface of the workpiece S is transferred to the sewing position Ps after passing through a measurement region FAf of the three-dimensional measurement device 30F. The specified region sewn at the sewing position Ps passes through the measurement region FAr of the three-dimensional measurement device 30R. In addition, the seams SE sewn at the sewing position Ps and formed in the specified region pass through the measurement region FAr of the three-dimensional measurement device 30R.

Similar to the above-described embodiment, the sewing machine 101 is controlled by the control device 40. The control device 40 outputs the control command for controlling the sewing machine 101 based on the measurement data of the specified region measured by the three-dimensional measurement device 30F.

In the embodiment, the three-dimensional measurement device 30 (30F and 30R) measures the specified region of the workpiece S in a state where the workpiece S is being sewn by the needle 3. The three-dimensional measurement device 30R measures the seams SE formed in the specified region of the workpiece S in a state where the workpiece S is being sewn by the needle 103. A state where the workpiece S is sewn by the needle 103 represents a state where a series of sewing continues, and includes a state where the needle 103 or the workpiece S is stopped.

As described above, in the embodiment, the three-dimensional measurement device 30 can also measure the three-dimensional shape of the workpiece S and the three-dimensional shape of the seams SE. Since the three-dimensional shape of the workpiece S and the three-dimensional shape of the seams SE are measured, the state of the workpiece S or the state of the produced product can be appropriately recognized. Therefore, it is possible to appropriately implement quality control of a product produced by the sewing.

Third Embodiment

A third embodiment will be described. In the following description, the same reference numerals will be given to the same or equivalent configuration elements as those in the above-described embodiment, and the description thereof will be simplified or omitted.

Figure 11:
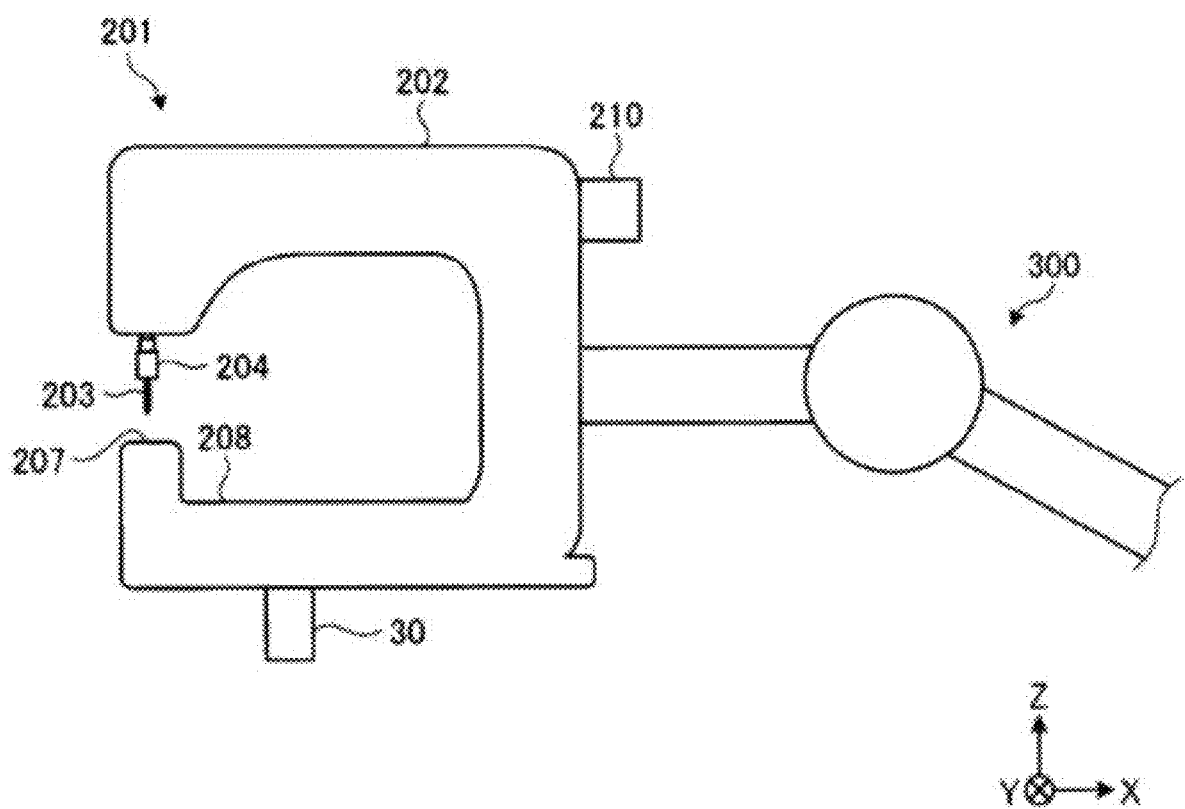
FIG. 11 is a view schematically illustrating the sewing system according to the embodiment.

FIG. 11 is a view schematically illustrating the sewing system 100 according to the embodiment. In the embodiment, the sewing system 100 includes a robot arm 300 that movably supports a sewing machine 201. The robot arm 300 is an articulated robot arm, and can move the sewing machine 201 in six directions, such as the X-axis direction, the Y-axis direction, the Z-axis direction, the θX direction, the θY direction, and the θZ direction.

As illustrated in FIG. 11, in the embodiment, the three-dimensional measurement device 30 is fixed to the lower surface of the sewing machine 201. The three-dimensional measurement device 30 is supported by the robot arm 300 via the sewing machine 201. In addition, the three-dimensional measurement device 30 may be supported directly by the robot arm 300 not passing through the sewing machine 201.

The sewing machine 201 is a lockstitch sewing machine that performs lockstitch. The sewing machine 201 includes a sewing machine head 202, a needle bar 204 that holds a needle 203, a throat plate 207, a bed portion 208, and a motor 210. The structure of the sewing machine 201 is the same as that of the sewing machine 101 described in the embodiment above, and thus the detailed description will be omitted.

Figure 12:
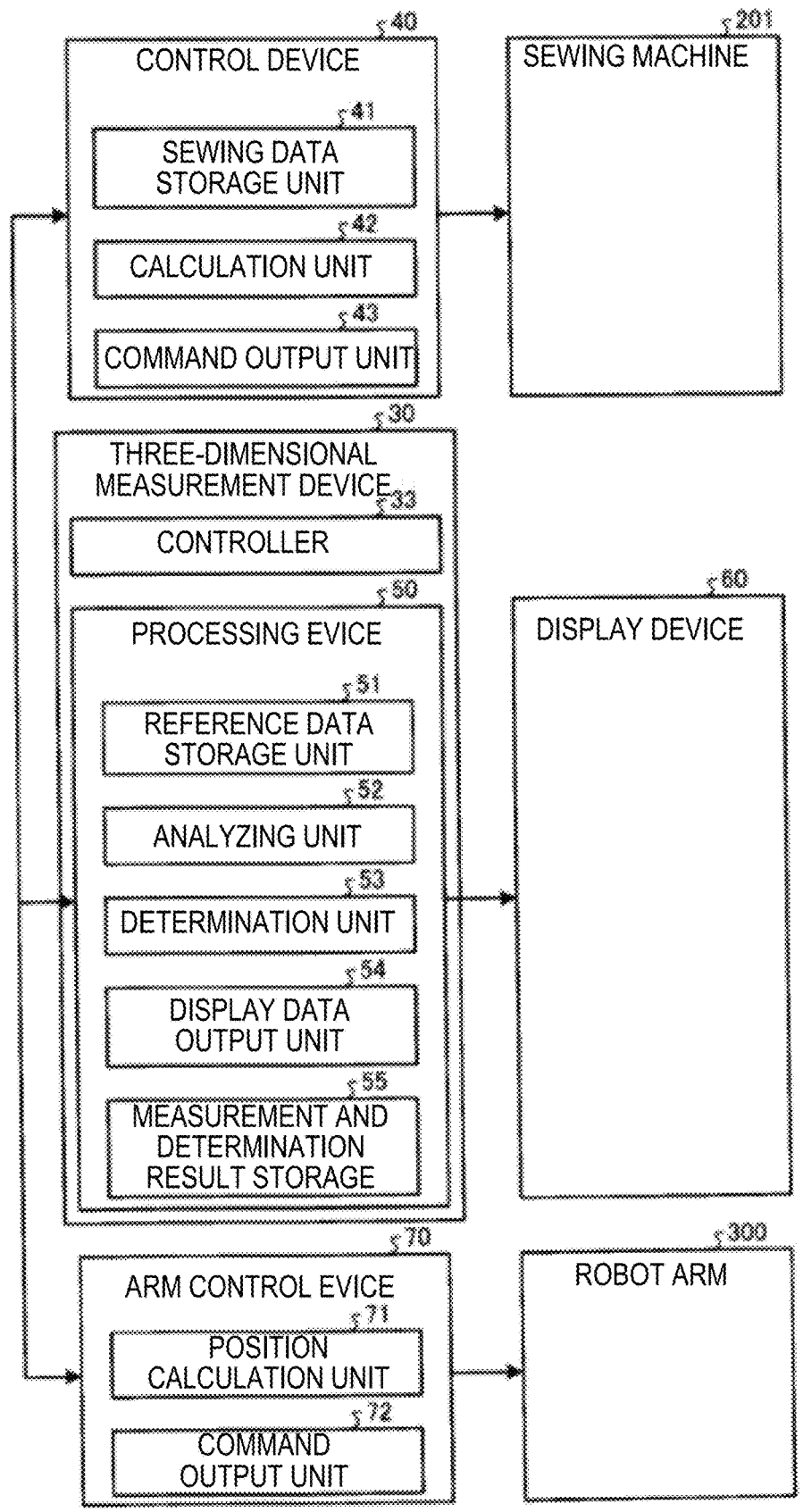
FIG. 12 is a functional block diagram illustrating a control system of the sewing system according to the embodiment.

FIG. 12 is a functional block diagram illustrating a control system of the sewing system according to the embodiment. As illustrated in FIG. 12, in the embodiment, the sewing system 100 includes an arm control device 70 that outputs a control command for controlling the robot arm 300.

The arm control device 70 includes a position calculation unit 71 that calculates the position data of the workpiece S, and a command output unit 72 that outputs the control command to the robot arm 300 based on the position data of the workpiece S.

Figure 13:
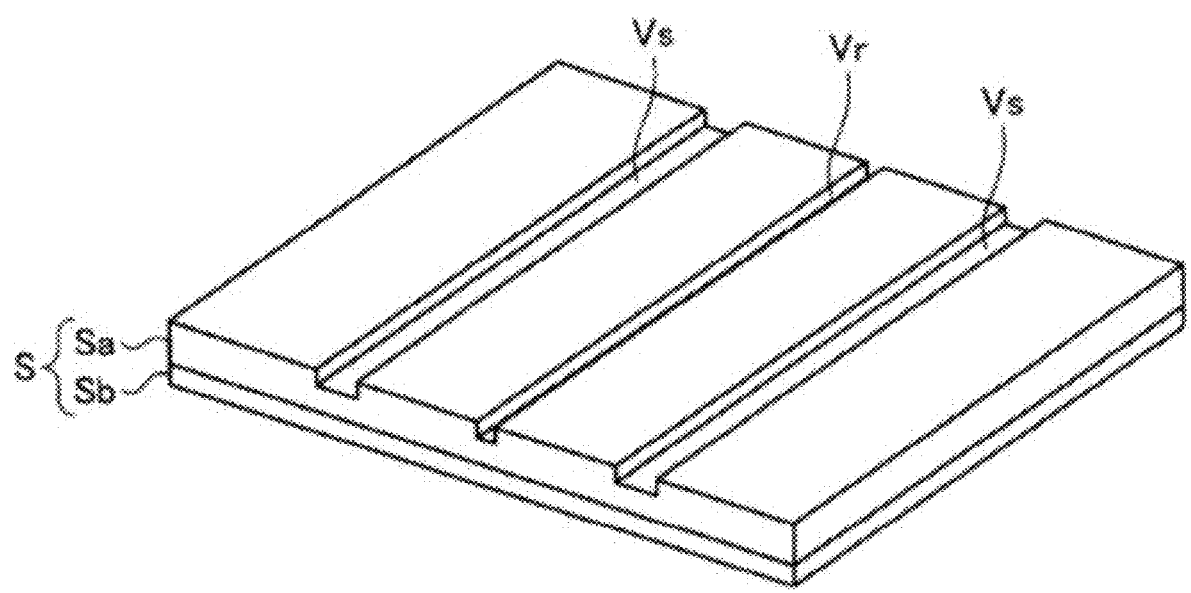
FIG. 13 is a view illustrating an example of the workpiece according to the embodiment.

FIG. 13 is a view illustrating an example of the workpiece S according to the embodiment. As illustrated in FIG. 13, the workpiece S includes a workpiece Sa and a workpiece Sb sewn to the workpiece Sa. The workpiece Sa is, for example, rubber. The workpiece Sa includes a straight reference groove Vr and sewing grooves Vs provided in parallel on both sides of the reference groove Vr.

Figure 14A:
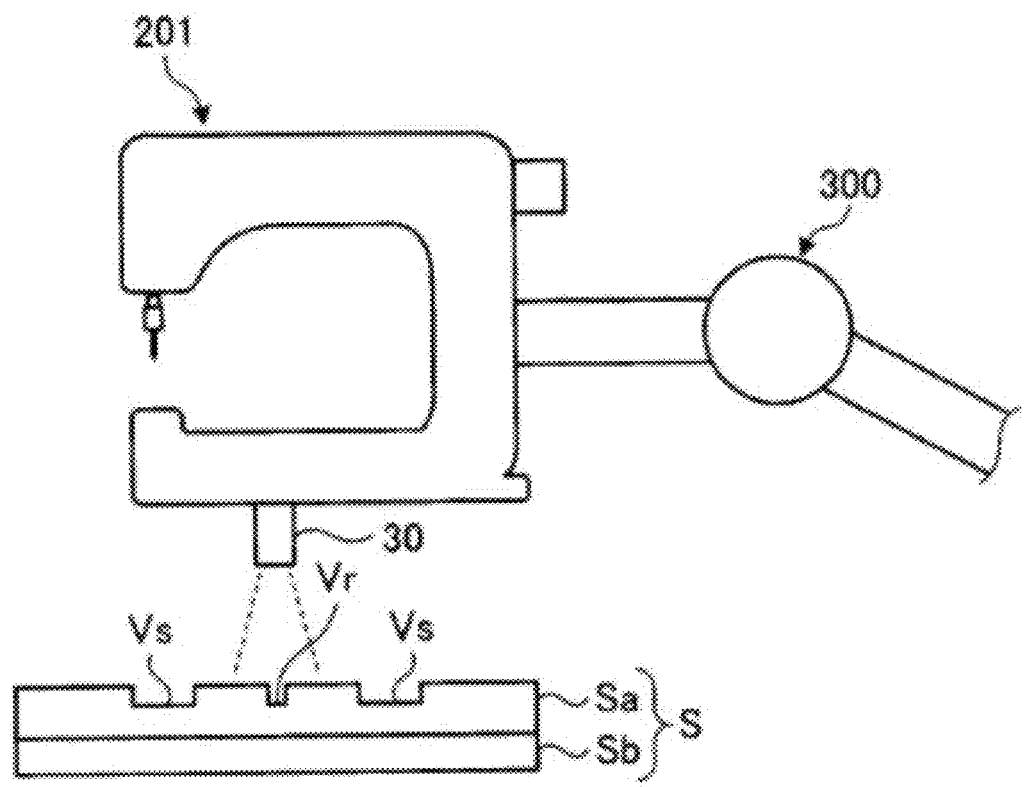
FIGS. 14A and 14B are views schematically illustrating an operation of the sewing system according to the embodiment.
Figure 14B:
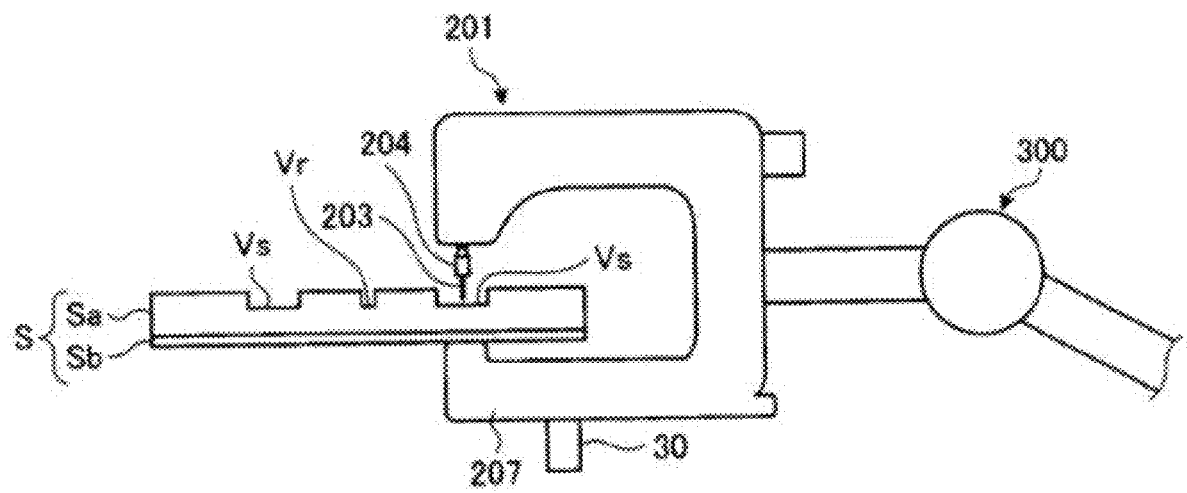

FIGS. 14A and 14B are views schematically illustrating an operation of the sewing system 100 according to the embodiment. The workpiece S is fixed to a tool. The position of the workpiece S is fixed. As illustrated in FIG. 14A, the command output unit 72 outputs the control command to the robot arm 300 such that the measurement region FA of the three-dimensional measurement device 30 and the workpiece S move relative to each other. The three-dimensional measurement device 30 measures at least the three-dimensional shape of the reference groove Vr. In the embodiment, the three-dimensional measurement device 30 measures the three-dimensional shapes of the reference groove Vr and the sewing groove Vs.

The position calculation unit 71 calculates the position data of the reference groove Vr and the position data of the sewing groove Vs in the local coordinate system, based on the measurement data of the workpiece S measured by the three-dimensional measurement device 30. Otherwise, in a case where there is already target position sewing data of the sewing groove Vs in the sewing data storage unit 41 of the control device 40, a correction value of the sewing data is calculated.

As illustrated in FIG. 14B, the command output unit 72 outputs the control command to the robot arm 300 such that the sewing position Ps is disposed on the inside of the sewing groove Vs, based on the position data of the reference groove Vr and the position data of the sewing groove Vs or the correction value. After the needle 203 is disposed on the inside of the sewing groove Vs, the command output unit 72 outputs the control command to the arm control device 70 such that the seams SE are formed along the sewing groove Vs. In addition, the control device 40 outputs the control command to the sewing machine 201.

As described above, the sewing machine 201 and the three-dimensional measurement device 30 may be supported by the robot arm 300. The three-dimensional measurement device 30 can measure the position data and the height data of the workpiece S in the local coordinate system. Therefore, the workpiece S can be sewn with high accuracy based on measurement data of the three-dimensional measurement device 30.

Above, the three-dimensional measurement device operated integrally with the sewing machine has been described, but the three-dimensional measurement device can be independently used as an inspection device for the workpiece S after the sewing separately from the sewing machine.

What is claimed is:

1. A sewing system comprising:
a sewing machine that sews a workpiece set at the sewing machine;
a three-dimensional measurement device disposed above the workpiece set at the sewing machine and that measures a three-dimensional shape of the workpiece; and
a control device that outputs a control command for controlling the sewing machine based on measurement data of the workpiece output from the three-dimensional measurement device,
wherein the control device is configured to correct a predetermined sewing data based on the measurement data of the workpiece output from the three-dimensional measurement device, the sewing data including a target moving condition of the workpiece.

2. The sewing system according to claim 1, wherein
the three-dimensional measurement device measures the workpiece before being sewn by the sewing machine, and
the control device outputs the control command based on the measurement data of the workpiece acquired before the workpiece is sewn by the sewing machine.

3. The sewing system according to claim 2, wherein
a specified region of a front surface of the workpiece is transferred to a sewing position immediately below a needle,
the three-dimensional measurement device measures the specified region before being transferred to the sewing position, and
the control device outputs the control command based on the measurement data of the specified region.

4. The sewing system according to claim 2, wherein
the front surface of the workpiece includes a step,
the measurement data of the workpiece includes step data indicating the position and height of the step, and
the control device outputs the control command based on the step data.

5. The sewing system according to claim 4, wherein
the control command includes an adjustment command of a relative position of a needle and the workpiece.

6. The sewing system according to claim 2, wherein
the measurement data of the workpiece includes position data of the workpiece, and
the sewing system further includes:
a robot arm that supports the sewing machine to be movable; and
an arm control device that outputs a control command to the robot arm to adjust a relative position of the sewing machine and the workpiece, based on the position data of the workpiece.

7. The sewing system according to claim 6, wherein
the three-dimensional measurement device is supported by the robot arm, and
the arm control device outputs a control command to the robot arm such that the sewing machine sews the workpiece after the three-dimensional measurement device measures the workpiece.

8. The sewing system according to claim 1, further comprising:
a processing device that detects an abnormality of the workpiece based on measurement data of the workpiece output from the three-dimensional measurement device.

9. The sewing system according to claim 8, wherein
the three-dimensional measurement device measures the workpiece after being sewn by the sewing machine, and
the processing device detects the abnormality based on the measurement data of the workpiece acquired after the workpiece is sewn by the sewing machine.

10. The sewing system according to claim 9, wherein
the three-dimensional measurement device measures the three-dimensional shape of seams formed on the workpiece by the sewing machine.

11. The sewing system according to claim 10, wherein
the measurement data of the seams includes height data of the seams, and
the processing device determines an abnormality of the seams based on the height data of the seams.

12. The sewing system according to claim 10, wherein
the sewing machine includes a needle bar that holds a needle, and a throat plate that supports the workpiece to be sewn by the needle, and
the three-dimensional measurement device measures the seams in a state where the workpiece is being sewn by the needle.

13. The sewing system according to claim 10, further comprising:
a display device that displays measurement data of the seams.

14. The sewing system according to claim 10, wherein
the three-dimensional measurement device includes a measurement and determination result storage unit that stores measurement data of the seams.

15. The sewing system according to claim 8, wherein
the sewing machine includes a needle bar that holds a needle, and a throat plate that supports the workpiece to be sewn by the needle, and
the three-dimensional measurement device measures the workpiece in a state being sewn by the needle.

16. The sewing system according to claim 1, further comprising:
a display device that displays measurement data of the workpiece.

17. A sewing system comprising:
a sewing machine that sews a workpiece set at the sewing machine;
a three-dimensional measurement device disposed above the workpiece set at the sewing machine and that measures a three-dimensional shape of seams formed on the workpiece by the sewing machine; and
a processing device that detects an abnormality of the seams based on measurement data of the seams output from the three-dimensional measurement device,
wherein the processing device calculates feature amount data of the seams from the measurement data of the seams and collates the feature amount data with reference data indicating a feature amount of a three-dimensional shape of normal seams.

* * * * *